No. 783,493.

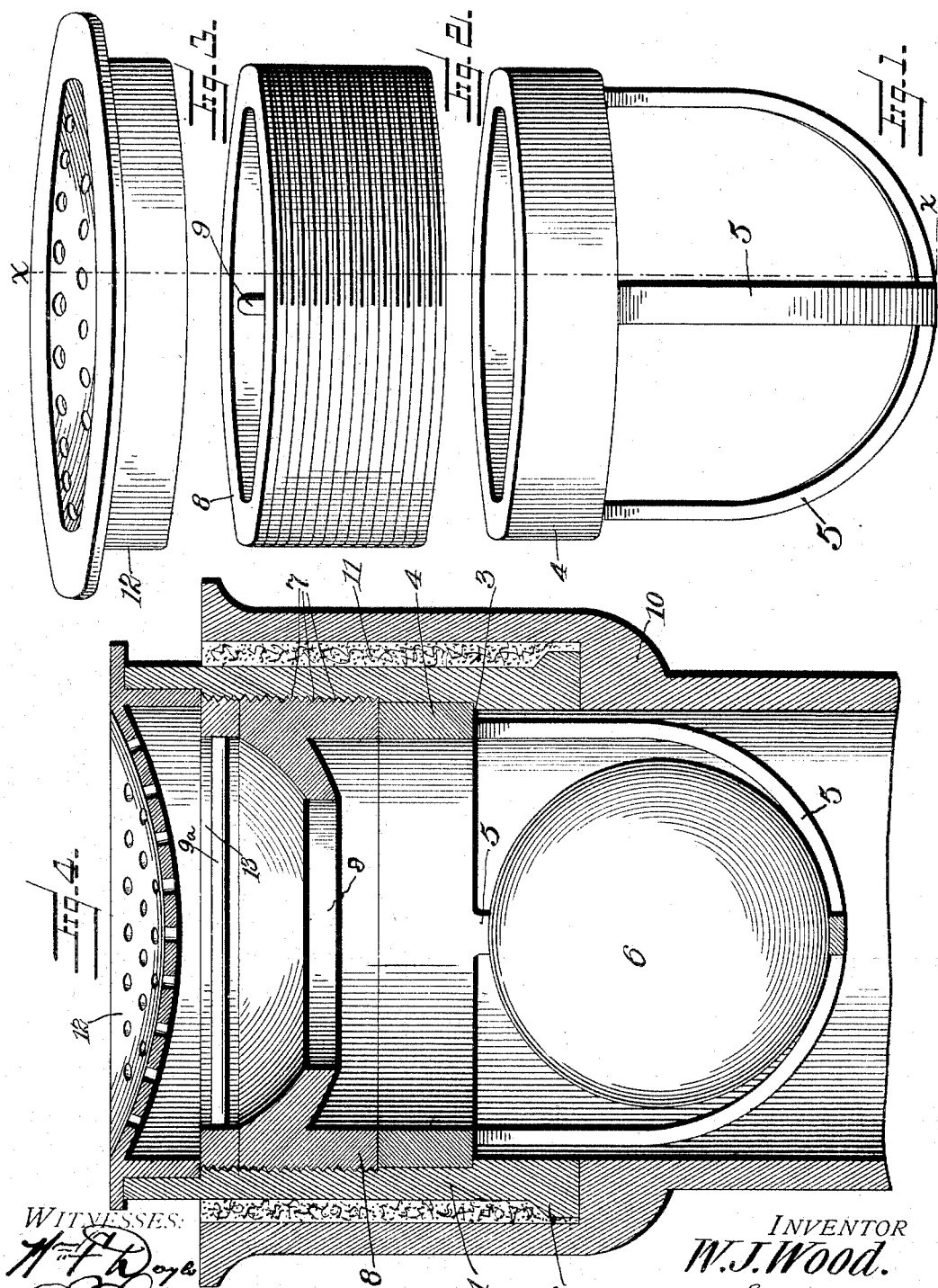

Patented February 28, 1905.

UNITED STATES PATENT OFFICE.

WILLIAM J. WOOD, OF ELIZABETH, NEW JERSEY.

BACK-PRESSURE VALVE FOR TRAPS.

SPECIFICATION forming part of Letters Patent No. 783,493, dated February 28, 1905.

Application filed April 21, 1904. Serial No. 204,213.

*To all whom it may concern:*

Be it known that I, WILLIAM J. WOOD, a citizen of the United States, residing at Elizabeth, in the county of Union and State of New Jersey, have invented a certain new and useful Improvement in Back-Pressure Valves for Traps, of which the following is a specification.

My invention relates to traps, drains, or sewer-pipes to prevent backflow of water, and has for its object to provide means adapted to admit water unrestrictedly to a drain-pipe, but to prevent the flooding or overflowing thereof.

The only trap now in common use with drain-pipes is a U water seal, which acts to prevent the escape of sewer-gas, but does not prevent the backward flow of water when the sewer becomes overfilled.

My invention is a new back-pressure water valve or check and is designed for use in conjunction with the ordinary U-water-seal trap and is adapted to fit and be placed within the enlarged end of the ordinary sewer-pipes. The complete back-pressure water-valve consists of a ball whose weight is less than that of an equal volume of water, a ball-cage, a member located above the ball and the ball-cage adapted to form a seat for the ball when it rises. These members for convenience in handling I inclose in an outer casing, and the entire back-pressure water-valve so formed is adapted to be placed integrally within the end of a sewer-pipe. The back-pressure water-valve is secured within the sewer-pipe by calking or any approved means, and a perforated cover similar to those in common use is placed over the top. When from overfilling the sewer-water "backs up" into the drain-pipe, the ball floats and rises until in comes in contact with the seat, where a water-tight joint is formed, which prevents the escape of sewage from the drain. It is obvious that the greater the pressure exerted by the water the more firmly seated becomes the valve, thus effectively preventing the escape of water under all conditions.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of my invention.

In the accompanying drawings, Figure 1 is a perspective view of the ball-retaining cage. Fig. 2 is a perspective view of the ball-check or valve-seat. Fig. 3 is a perspective view of the perforated cover; and Fig. 4 is a vertical sectional view of my complete invention assembled and placed in the end of a sewer-pipe as it appears in use and taken on line $x\,x$ of Figs. 1, 2, and 3.

Like reference-numerals designate corresponding parts throughout the various views.

In the preferred embodiment of my invention I construct a cylindrical member 1, having at its lower edge an integral peripheral flange 2. Within member 1 and near the bottom thereof I construct a shoulder 3, extending all the way around the said member and serving as a seat for collar 4 of the ball-cage. Depending from the collar 4 I construct a plurality of straps or stirrups 5, forming a cage-like receptacle for the ball 6. Within member 1 I form internal screw-threads 7 throughout that portion of its length disposed above collar 4 of the ball-cage. Above collar 4 I insert a ball-check or valve-seat member 8 with external screw-threads adapted to engage internal screw-threads 7. Within said ball-check member 8 I form an inwardly-extending flange 9 all the way around the said member. This flange may be, as shown, a downwardly-extending concaved surface, or it may be a downwardly-extending conical shape, or the under surface may be concaved to fit the spherical shape of the ball 6, as may be considered desirable. Within the upper portion of member 8 and diametrical thereto I construct bar $9^a$ to serve as a handhold to be employed in placing member 8 within cylinder 1 and rotating it to engage the screw-threads. The screw-threaded member 8 is adapted to be screwed down upon and retain collar 4 of the ball-cage in the position shown. The central opening within the member 8, formed at and by the lower extremity of flange 9, is formed smaller in diameter than ball 6 to prevent the ball passing therethrough. The entire back-pressure water-valve thus assembled is placed integrally within the enlarged end of a common sewer-pipe 10 and secured therein by the calking or packing 11, introduced between the inner periphery of pipe 10 and the outer periphery of cylinder 1 and engaging flange 2 to prevent displacement.

To prevent the introduction of matter liable to obstruct my back-pressure water-valve and prevent its proper working, I place over the top of the same a perforated cap 12, adapted to fit snugly within the top of the cylinder 1.

The collar member 13 shown may be constructed integral with member 8 or separate therefrom. When these parts are made separate, the member 8 need not be externally screw-threaded, it being retained within cylinder 1 by collar 13 being screwed down tightly thereupon.

The installation and operation of my improved back-pressure water-valve is as follows: I first place the ball-cage within cylindrical member 1 until the collar 4 rests against shoulders 3 with straps 5 extending through and beyond the end of cylinder 1. Within the cage formed by straps 5 I place ball 6. Member 8 is now placed above and upon collar 4 by screwing within cylinder 1. If the construction is of the modified form, with collar 13 separate from member 8, then member 8 is placed within cylinder 1 and collar 13 screwed down thereupon. The entire back-pressure water-valve is now placed integrally within the end of a sewer-pipe 10 and secured therein in any approved manner, as by pouring molten lead between cylinder 1 and pipe 10 or in any approved manner. Over the top is placed perforated cap 12. Water entering through the perforations in cap 12 will flow downward through member 8 and collar 4 and through the openings between straps 5, all of which offers no material obstruction to the inflow of water. If, however, as frequently occurs, the drainage capacity of the sewer is overtaxed and the water backs up within the pipe 10, then the ball 6, having a less weight than an equal volume of water, will float. The ball 6 in rising comes in contact with flange 9 and acts as a check-valve to prevent the further flow and escape of the sewage.

Having thus described my invention, what I claim as novel, and desire to secure by Letters Patent, is—

1. In a device of the character described, the combination of a cylindrical member provided with an internally-disposed annular shoulder, a ball-cage adapted to be removably placed within the cylinder and provided with a collar adapted to rest upon the annular shoulder, a valve-seat adapted to rest upon the collar of the ball-cage and means adapted for holding said members together to form an integral trap.

2. In a device of the character described, the combination of a cylindrical member provided with an internally-disposed annular shoulder near the lower end thereof, internal screw-threads disposed above the shoulder and a second annular shoulder disposed above the screw-threaded portion, a ball-cage adapted to be removably placed within the cylinder and provided with a collar adapted to rest upon the lower shoulder, a valve-seat provided with screw-threads adapted to engage the internal screw-threads of the cylinder and bear and exert pressure upon the collar of the ball-cage, and a perforated cap adapted to fit within the upper end of the cylinder and rest upon the upper shoulder and all adapted to be integrally and removably secured within a pipe-opening.

WILLIAM J. WOOD.

In presence of—
CHAS. A. TRIMBLE,
CHAS. ROBERTS.